US011973537B2

(12) United States Patent
Van Veen et al.

(10) Patent No.: US 11,973,537 B2
(45) Date of Patent: Apr. 30, 2024

(54) FLEXIBLE RATE PASSIVE OPTICAL NETWORK INCORPORATING USE OF DELAY MODULATION

(71) Applicant: Nokia Solutions and Networks Oy, Espoo (FI)

(72) Inventors: Doutje Van Veen, New Providence, NJ (US); Vincent Houtsma, New Providence, NJ (US)

(*) Notice: Subject to any disclaimer, the term of this patent is extended or adjusted under 35 U.S.C. 154(b) by 105 days.

(21) Appl. No.: 17/686,927

(22) Filed: Mar. 4, 2022

(65) Prior Publication Data

US 2023/0283377 A1 Sep. 7, 2023

(51) Int. Cl.
*H04B 10/516* (2013.01)
*H04B 10/272* (2013.01)
*H04J 14/08* (2006.01)
*H04L 7/00* (2006.01)

(52) U.S. Cl.
CPC ......... *H04B 10/272* (2013.01); *H04B 10/516* (2013.01); *H04B 10/5161* (2013.01); *H04J 14/08* (2013.01); *H04L 7/0075* (2013.01)

(58) Field of Classification Search
None
See application file for complete search history.

(56) References Cited

U.S. PATENT DOCUMENTS

| 5,412,379 A * | 5/1995 | Waraksa ............ G07C 9/00182 340/5.72 |
| 5,748,348 A | 5/1998 | Heidemann et al. |
| 7,133,621 B1 | 11/2006 | An |
| 2011/0019681 A1* | 1/2011 | Gazier ................. H04J 3/0638 370/503 |
| 2019/0253152 A1* | 8/2019 | Houtsma ............. H04B 10/541 |
| 2023/0239056 A1* | 7/2023 | Zeydel ................ H04B 10/27 398/58 |

OTHER PUBLICATIONS

Hu, Sheng et al., "Flexible tunable optical transceiver based on field-programmable gate array for time and wavelength-division multiplexed passive optical network systems", Optical Engineering, Soc. of Photo-Optical Instrumentation Engineers, Bellingham, vol. 55, No. 8, Aug. 23, 2016, pp. 86110-1 to 86110-5.
Horvath. Tomas et al., "Using Miller's Code in NG-PON2 Networks", ELEKTROREVUE, vol. 5, No. 2, Jun. 20, 2014, pp. 20-26.

(Continued)

*Primary Examiner* — Li Liu
(74) *Attorney, Agent, or Firm* — Capitol Patent + Trademark Law Firm, PLLC (57) ABSTRACT

Apparatus and method are disclosed that utilize a particular delay modulation technique (i.e., Miller coding) to encode 25 Gb/s data for inclusion with the 50 Gb/s NRZ data in a downstream broadcast transmission from an optical line terminal (OLT) to a plurality of optical network units (ONUs) through an optical distribution network (ODN). The specific Miller coding technique allows for a secondary data stream, operating at half the rate of the NRZ data) to supplement the primary 50 Gb/s NRZ transmission, since both signals are recovered using the same clocking circuitry at the ONU.

13 Claims, 8 Drawing Sheets

(56) References Cited

OTHER PUBLICATIONS

50-Gigabit-capable passive optical networks (50G-PON): Physical media dependent (PMD) layer specification,Series G: Transmission Systems and Media, Digital Systems and Networks, Recommendation ITU T G.9804.3, Sep. 2021.
World's First Field Trial of 100 Gbit/s Flexible PON (FLCS-PON), Borkowski et al, IEEE, 2020.
50Gb/s TDM PON Digital Signal Processing Challenges:Mining current G-PON Field Data to Assist Higher Speed PON Simon et al, IEEE, 2020.
Unified Evolution-Ready 25 Gbps NG-PON Architecture, Houtsma et al, ECOC 2016 42nd European Conference and Exhibition on Optical Communications Sep. 18-22, 2016 Düsseldorf.
DSP for 50G/100G Hybrid Modulated TDM-PON, Kaneda et al, IEEE, 2020.
Proceedings of the IEEE, pp. 1314-1316, Jul. 1969.
40-Gigabit-capable passive optical networks 2 (NG PON2): Physical media dependent (PMD) layer specification, Series G: Transmission Systems and Media, Digital Systems and Networks Digital sections and digital line system—Optical line systems for local and access networks, ITU-T G.989.2Telecommunications Standardization Sector of ITU, Feb. 2019.
Study of bandwidth enhancement and nonlinear behavior in avalanche photodiodes under high power condition J. Appl. Phys. 113, 044509 (2013); https://doi.org/10.1063/1.4788694 Submitted: Dec. 5, 2012 • Accepted: Jan. 4, 2013 • Published Online: Jan. 24, 2013 Wenlu Sun, Yang Fu, Zhiwen Lu, et al.
Flexible Upstream FEC for Higher Throughput, Efficiency, and Robustness for 50G PON, Mahadevan et al, OFC 2022 © Optica Publishing Group 2022.

\* cited by examiner

FLEXIBLE RATE PASSIVE OPTICAL NETWORK INCORPORATING USE OF DELAY MODULATION

TECHNICAL FIELD

Disclosed herein are various embodiments of a passive optical network (PON) supporting multiple modulation formats in a broadcast downstream transmission.

BACKGROUND OF THE INVENTION

A passive optical network (PON) typically has a point-to-multipoint (P2MP) architecture in which passive optical splitters are used to enable a single optical transmitter to broadcast data transmissions to multiple subscribers. An exemplary PON includes an optical line terminal (OLT) at a service provider's network location and a plurality of optical network units (ONUs) near or at the end-user locations. The ONUs are connected to the OLT by way of an optical distribution network (ODN) that comprises one or more passive optical splitters. In a time-division-multiplexed (TDM) PON, downstream signals are typically broadcast to all ONUs, with upstream signals from the individual ONUs controlled using some type of multiple-access protocol.

The recently promulgated international standard ITU-T G.9804 for TDM PON provides a fixed 50 Gb/s ("50G") transmission rate in the downstream direction by employing non-return-to-zero (NRZ) modulation, independent of the particular channel conditions within the network. However, the fixed rate 50G standard may be problematic for use by a portion of the already installed base, with older generation receiver equipment within certain ONUs not able to operate well with 50G NRZ data for a variety of reasons. First, the front-end receiver components (both optical and electronic) in some ONUs lose performance capabilities as they age (such as lower signal-to-noise ratio in the O/E conversion), introducing an unacceptable bit error rate (BER) in the recovered data stream. Additionally, various ONUs may have been originally designed to operate near margin conditions (link loss, for example) associated with prior standard transmission rates. These are just two examples, and other factors related to the performance of the existing base of ONU modules may be found to hamper the acceptance of a 50G fixed rate NRZ for downstream transmission.

SUMMARY OF THE INVENTION

The needs remaining in the art are addressed by the present invention, which relates to a time-division multiplexed (TDM) passive optical network (PON) that is capable of supporting not only the standard-defined fixed rate 50G NRZ data, but also a lower line-rate modulation scheme that utilizes the same front-end receiver configuration as used for 50G NRZ, thus allowing for the installed base of ONUs to support a 25 Gb/s ("25G") data stream in additional to the 50G data stream.

In accordance with the principles of the present invention, an apparatus and method are disclosed that utilize a particular delay modulation technique (referred to hereinafter at times as "Miller encoding") to encode 25G data for inclusion with the 50G NRZ traffic in the downstream broadcast transmission from an optical line terminal (OLT) to a plurality of optical network units (ONUs) through an optical distribution network (ODN). More generally, the delay modulation technique allows for a secondary data stream, operating at half the rate of the NRZ data) to also be sent, since both signals are recovered using the same clocking circuitry at the ONU.

Advantageously, 25G Miller-encoded data requires a clock running at twice that rate to recover the transmitted data stream. Inasmuch as the recently-published PON system standard is based upon the use of 50G NRZ modulation, the clock and data recovery (CDR) circuitry within the ONU's receiver needs to operate at a 50 Gbaud rate to be in compliance with the standard. Thus, this same 50 Gbaud rate (being twice the rate of the Miller-encoded 25G data) is precisely the clocking speed required to recover the encoded 25G Miller data. The installed ONU base is thus able to easily recover both 50G NRZ data and 25G Miller data.

In addition to providing extended reach and/or higher loss capability, the inclusion of data transmission operating at a 25G rate offers a "safe mode" option for operating the PON system in the event of certain ODN fault scenarios that may limit 50G (or higher) transmission capabilities.

An exemplary embodiment takes the form of apparatus comprising transmission circuitry and encoding circuitry. The transmission circuitry is configured to create a downstream transmission in a point-to-multipoint (P2MP) passive optical network (PON) from at least two separate input signals. The two signals including a first input signal comprising NRZ modulated data operating at a first data rate and a second input signal operating at a second data rate that is one-half of the first data rate. The encoding circuitry is responsive to an input data stream operating at the second data rate and generates therefrom a delay-modulation encoded output signal which is thereafter applied as the second input signal to the transmission circuitry.

Another embodiment comprises a method of forming a downstream transmission in a passive optical network (PON), where the method includes the steps of: accepting a first input data signal in an NRZ modulation format and operating at a first data rate; accepting a second input data signal operating at a second data rate that is one-half of the first data rate; applying a delay-modulation encoding to the second input data signal; and forming the downstream transmission including both the NRZ-modulated first input data signal and the delay-modulation encoded second input data signal.

Other and further embodiments and aspects of the present invention will become apparent during the course of the following discussion and by reference to the accompanying drawings.

BRIEF DESCRIPTION OF THE DRAWINGS

Referring now to the drawings.

DETAILED DESCRIPTION

A PON system is proposed that provides a degree of flexibility to the 50G fixed rate standard of ITU-T G.9804 in a broadcasted downstream transmission. Based on the presumption that the installed base of ONUs include receiver components that perform 50 Gbaud clock and data recovery (CDR), as necessary for the 50G NRZ data, a flexible PON system is formed in accordance with the present invention that is also able to support transmission and recovery of lower line-rate data within the same ONU receiver design. In particular, it has been found that a 25G data stream encoded by a particular delay modulation scheme (also referred to as "Miller encoding" as a tribute to its inventor Armin Miller, as documented in U.S. Pat. No. 3,108,261), allows for transmission at the lower rate of 25G (extending the reach of the PON system and providing additional loss margin) while using the same in-place 50 Gbaud CDR at the ONUs to provide recovery of the original data. Miller-encoded data requires the use of a clock running at twice its data rate to properly recover the original data. Therefore, in a PON system using a 50 Gbaud CDR capability, a Miller-encoded transmission may also be supported. As discussed below, an inventive flexible PON system is able to continue to support legacy ONUs by including this 25G Miller-encoded signalling option.

Figure 1:
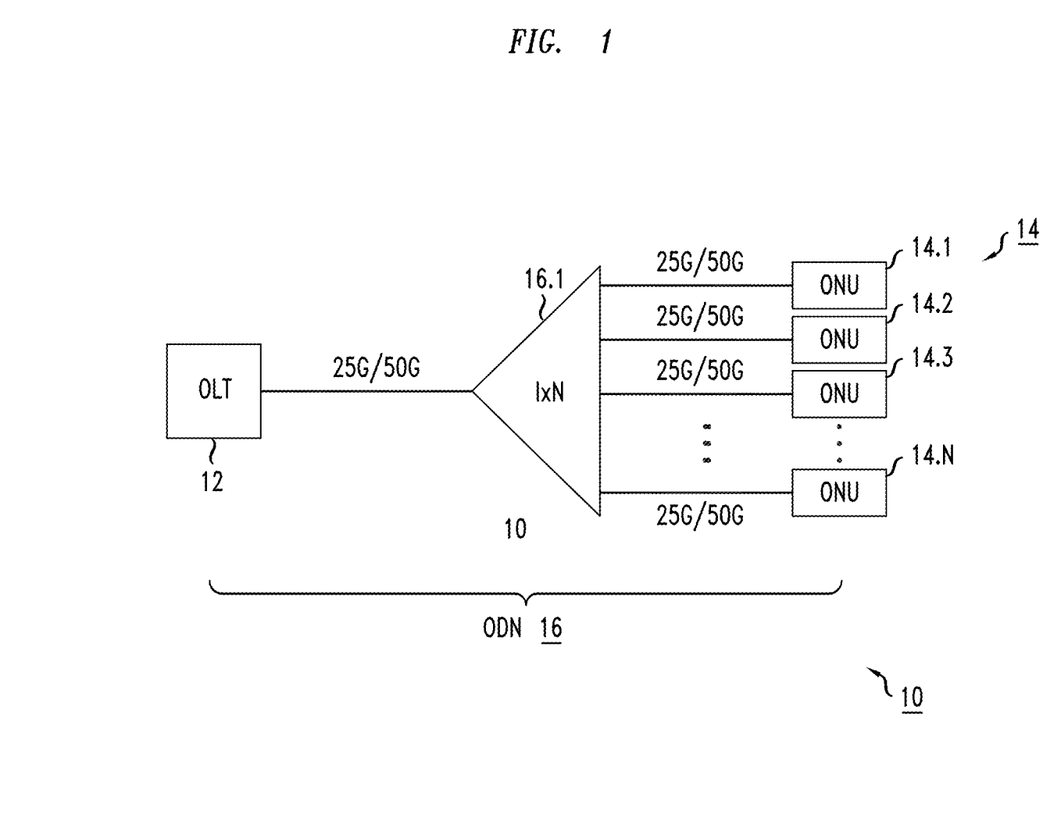
FIG. 1 is a diagram of an exemplary PON system that may be configured to support downstream transmission of both 50G NRZ data and delay modulation-encoded (Miller) data.

FIG. 1 is a schematic block diagram of a TDM PON system 10 useful in understanding the implementation of a flexible 25G/50G downstream modulation transmission system in accordance with the principles of the present invention. FIG. 1 illustrates a conventional topology including an optical line terminal (OLT) 12 that communicates with a plurality of optical network units (ONUs) 14 via an optical distribution network (ODN) 16. The specific number of ONUs associated with a given OLT may be a function of the particular application (for example, a last-mile application of FTTx may serve a relatively small number of ONUs, while a mid-span link in a radio network may need to support hundreds of ONUs).

ODN 16 can be thought of as a data distribution system that comprises optical fiber cables, couplers, splitters, and other suitable passive components. ODN 16 typically extends from OLT 12 to ONUs 14 in a branching configuration, simply represented in this diagram as comprising a single 1×N splitter 16.1. In general, ODN 16 may be configured in any other suitable point-to-multipoint (P2MP) manner for TDM PON systems.

In operation of flexible rate PON 10, OLT 12 is configured to broadcast a single downstream transmission (illustrated as 25G/50G in FIG. 1) to all of the ONUs 14, where each individual ONU 14.x is configured to extract its unique "user block" of data from each received PON frame, discarding the remainder of the blocks. In this flexible environment, each downstream PON frame may include both 25G Miller-encoded data and 50G NRZ data.

Figure 2:
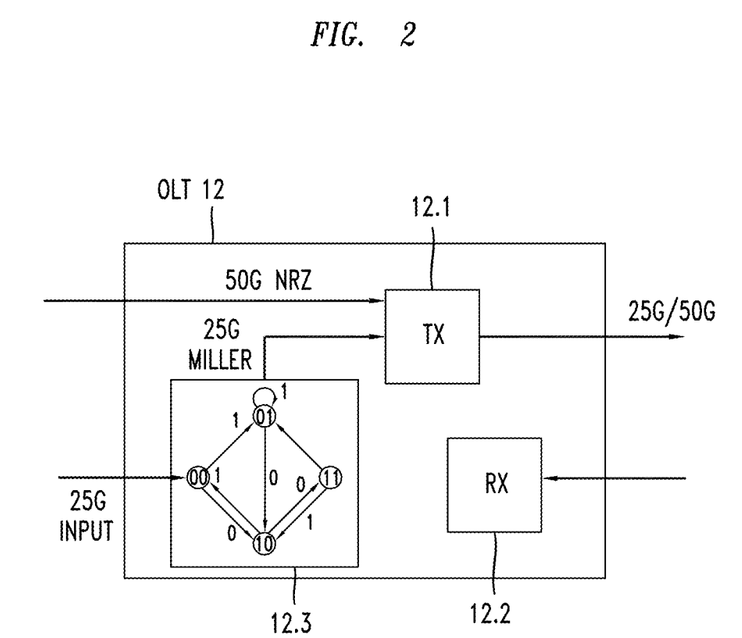
FIG. 2 illustrates an exemplary OLT that may be used to prepare a downstream transmission of both 50G NRZ and 25G Miller, including an encoding component used to create the Miller-encoded data stream.

An exemplary OLT 12 is shown in FIG. 2 as including a transmission circuitry module 12.1 and a receiver circuitry module 12.2. Transmission circuitry 12.1 is configured to construct the PON frames for downstream transmission in a manner well-known in the art, where in this embodiment of the present invention, two input data streams (25G Miller and 50G NRZ) are provided as inputs to transmission circuitry module 12.1. Receiver circuitry 12.2 functions in a conventional manner that is not germane to the subject matter of the present invention, which is specifically directed to the provisioning of a downstream transmission that accommodates different modulation formats.

Figure 3:
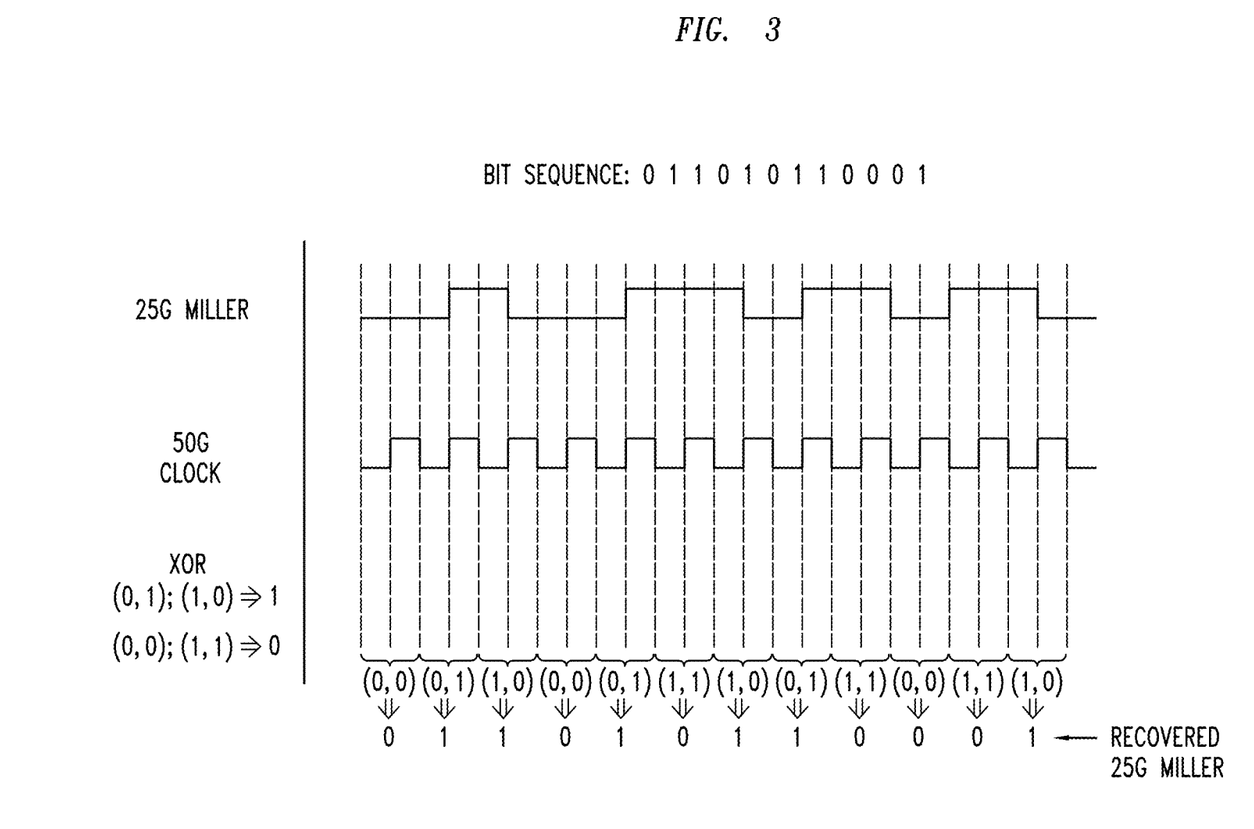
FIG. 3 contains a set of timing diagrams showing the delay-modulation (Miller) encoding process for a given bit stream input, a clock rate as used at the ONU, and the recovered data after passing through XOR logic.

In particular, OLT 12 is shown as further comprising a delay modulation encoder 12.3 (also referred to at times as a "Miller encoder" or "encoding circuitry"), which is responsive to an input digital data stream operating at 25G and generates therefrom Miller-encoded data for transmission to ONUs 14. Miller encoding, as described in detail below in association with FIG. 3, is represented in the diagram of FIG. 2 by its finite state machine form within encoder 12.3. The symbolic representation in this form is fashioned into logic circuitry that creates the specific encoding explained in detail below. In operation, the delay modulation (Miller) encoding scheme uses the information of two adjacent input information bits to generate the encoded output symbol (hence, a first bit is "delayed" in being coded until the second bit is present). For ease of understanding, "delay modulation" encoding will be described hereinafter as "Miller" encoding.

In particular, Miller encoding applies the following rules: (1) each logic 1 is represented by a mid-bit transition; (2) a logic 0 that is followed by and preceded by a logic 1 is ignored; and (3) a pair of adjacent logic 0's is represented by a transition at the mid-point of the pair. In the context of the present invention, the Miller encoded data stream output from encoder circuitry 12.3 is referred to as "25G Miller", which is transmitted along with 50G NRZ, as shown in flexible PON system 10 of FIG. 1.

FIG. 3 illustrates a data stream encoded using the Miller coding scheme embodied by encoder circuitry 12.3. As shown, each logic 1 is coded as a transition in the middle of the bit period (the transition itself may occur in either direction, depending on the values of the previous bits, with both directions shown in FIG. 3). Isolated logic 0's are ignored (as per rule (2) mentioned above), and a transition is inserted at the beginning of a second bit period for a pair of adjacent logic O's. As mentioned above and discussed in more detail below, decoding the Miller-encoded data requires a clock running at twice its data rate and, therefore, the 50 Gbaud CDR circuitry used for decoding 50G NRZ data is appropriate for handling the 25G Miller-encoded data as well.

Since Miller encoding is a run-length limited code (here, the longest time span possible without a transition is two bits in length), it has very good timing/clock recovery properties and is immune to polarity inversion. That is, Miller encoded data is self-clocking, with the clock signal necessary for decoding being directly obtained from the encoded data itself. As a result, a Miller encoded 25G signal looks very much like a 50G NRZ signal in terms of bit transitions while still maintaining many of the benefits of a lower baud-rate signal.

Figure 4:
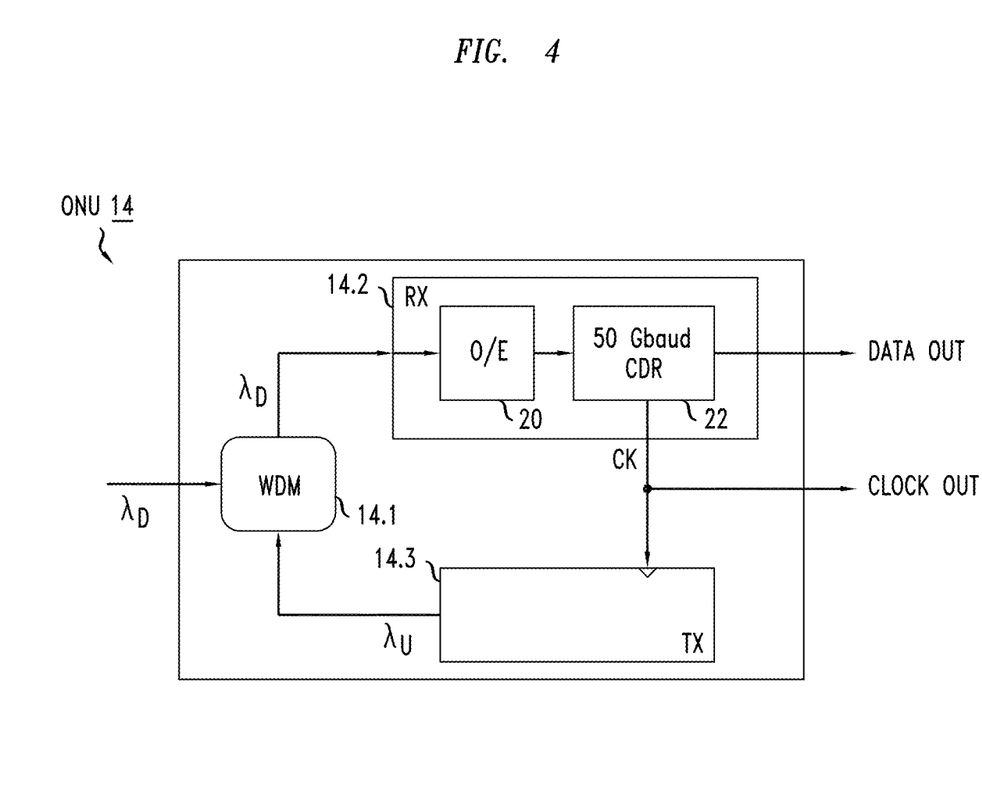
FIG. 4 is a simplified block diagram of an ONU that may be used to recover both 50G NRZ data and 25G Miller data.

FIG. 4 is a block diagram of an exemplary ONU 14 that is able to recover both the 50G NRZ data and 25G Miller data in accordance with the principles of the present invention. Here, ONU 14 includes an optical coupling component 14.1 (e.g., a wavelength division multiplexer) that is used to direct the broadcasted downstream 25G/50G transmission (operating at a known wavelength XD) to an optical receiver component 14.2. An optical transmitter component 14.3 is included within ONU 14 and directs upstream data traffic (on a separate wavelength Xu) through WDM 14.1 and back into ODN 16 in a well-known manner.

For the purposes of the present invention, optical receiver component 14.2 is considered as comprising an O/E element 20 and a CDR circuitry module 22, where in order to recover 50G NRZ data, CDR circuitry module 22 functions to extract a 50G clock from the stream and use it to re-time the stream and recover the transmitted data. The recovered 50G clock is also depicted in FIG. 3 and illustrates how the use of a clock operating at twice the Miller encoding rate is able to recover the original Miller-encoded data stream.

In particular, since the original Miller encoding relies on the value of adjacent bits to perform the coding (i.e., a "delayed modulation" scheme), the double-sampling of each transmitted 25G Miller data symbol essentially reverses the delay. Conceptually and as shown in FIG. 3, two samples of each received 25G Miller symbol are created by using the 50G clock. The logic values of the two samples are passed through an XOR logic gate to produce the original Miller-encoded bit. That is, in accordance with standard XOR logic circuitry, a (0,0) or (1,1) pair of inputs to an XOR gate generates a logic 0 output; a (1,0) or (0,1) pair of inputs to an XOR gate generates a logic 1 output. The application of the XOR function is shown in FIG. 3 as applied to the pair of samples from each received 25G Miller data symbol, with the original data stream shown as being recovered by this function.

Figure 5:
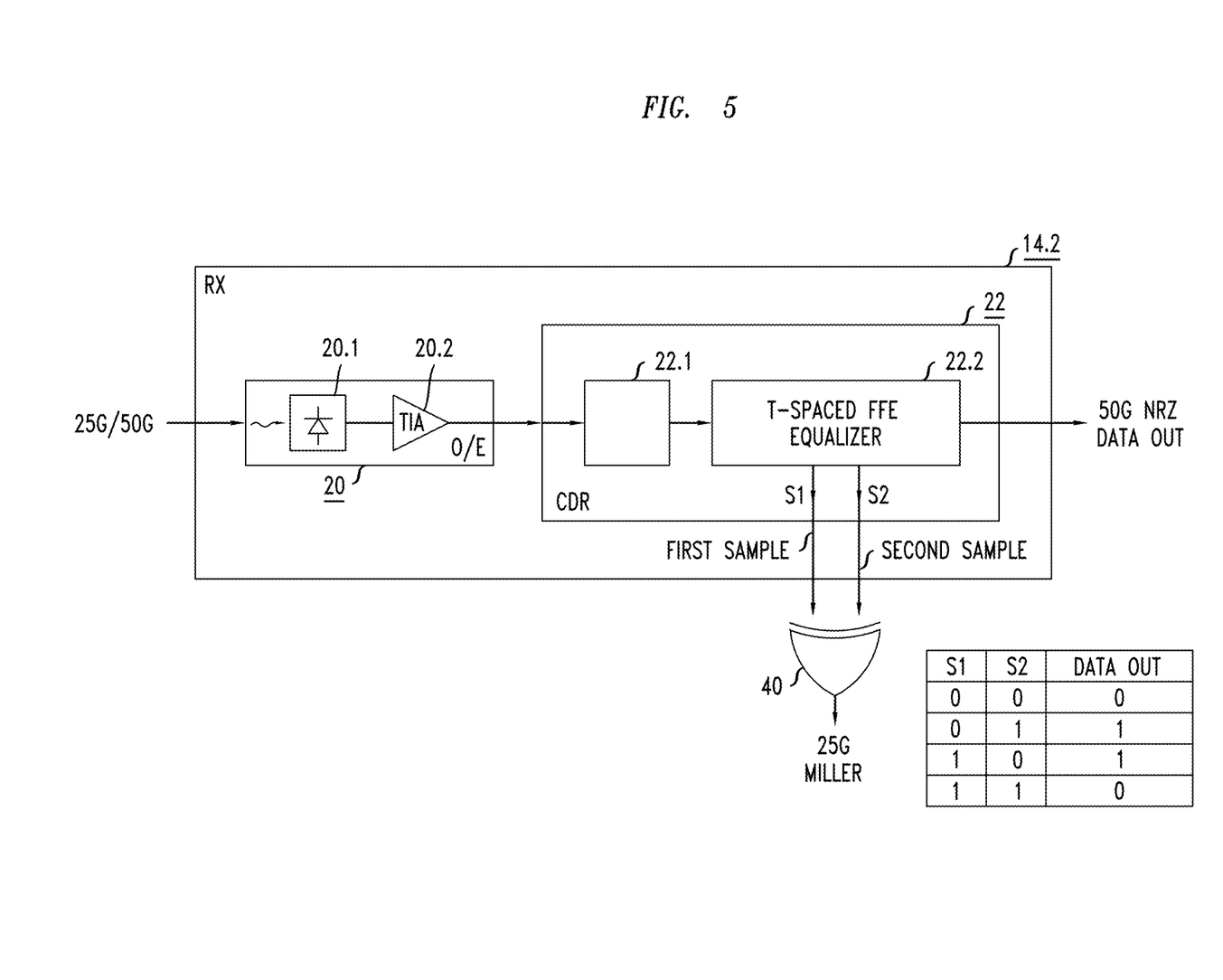
FIG. 5 illustrates exemplary components within the receiver portion of the ONU of FIG. 4.

FIG. 5 is a somewhat more detailed illustration of an exemplary receiver 14.2 included in ONU 14 as described above in association with FIG. 4. Here, O/E element 20 is shown as comprising a photodiode 20.1 and a transimpedance amplifier circuitry (TIA) 20.2. The electrical output from TIA 20.2 is thereafter applied as an input to the 50 Gbaud CDR circuitry module 22. In this embodiment, CDR module 22 includes a decision-directed, symbol-based Mueller-Muller timing error detector (TED) circuit 22.1 with an integrated 15-tap fast forward error correction (FFE) equalizer circuit 22.2. The use of a 15-tap FFE equalizer is very similar to the specified reference receiver as specified in G.9804. In the case of recovering the 50G NRZ data, the output of FFE equalizer 22.2 is the data signal itself.

In accordance with the principles of the present invention, the same CDR circuitry (i.e., providing the 50 Gbaud rate) is appropriate for recovering the lower line-rate Miller-encoded data. In particular for the 25G Miller signal, decoding of the recovered bit stream is accomplished by XORing two consecutive 50G bits, as shown in the diagram of FIG. 3, to convert the individual recovered bits into the 25G Miller symbols as originally encoded. In the diagram of FIG. 5, this additional step of recovering the Miller-encoded data is shown by XOR gate 40, which receives a pair of samples in the manner described above, providing as the output the recovered 25G Miller data.

Figure 6:
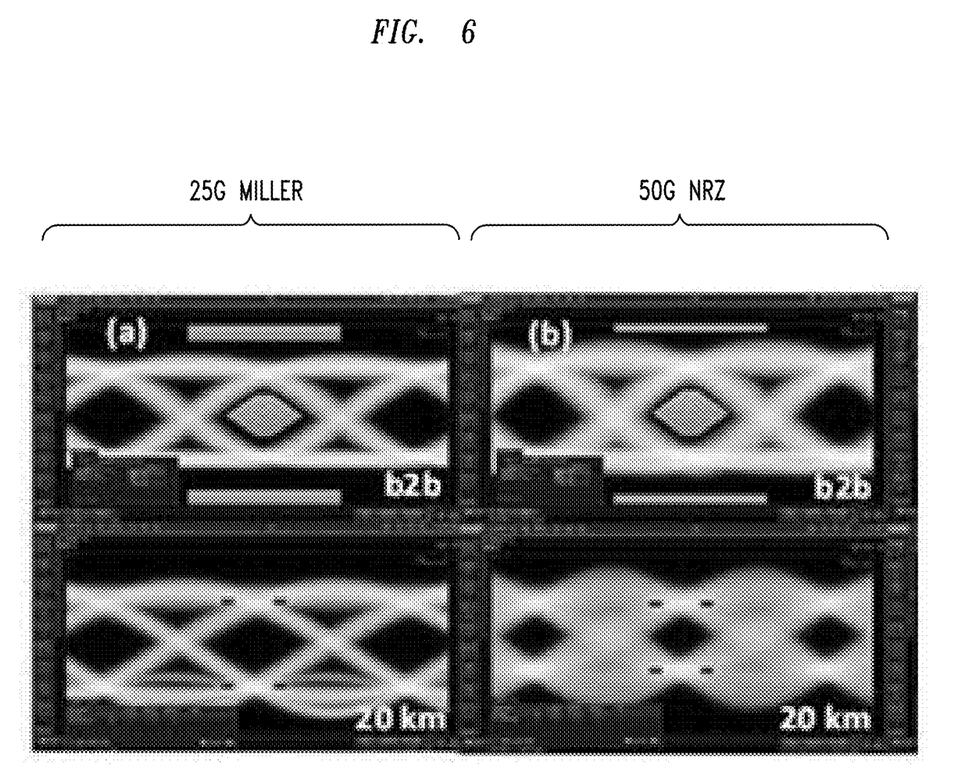
FIG. 6 includes eye diagrams for both 25G Miller data and 50G NRZ data.

FIG. 6 includes measured eye diagrams for both 25G Miller data (shown in diagrams (a)) and 50G NRZ data (shown in diagrams (b)). The top diagram in each case is experimental data measured in a "back-to-back" (b2b) arrangement of OLT-ONU, with the bottom diagram showing measured results when including 20 km of optical fiber between the OLT and the ONU. In particular, the illustrated data was measured at the output of FFE equalizer 22.2. The outer modulation amplitude (OMA) of the signals was optimized for the 25G/50G "mixed signal" operation and set to the same value so as to maintain a similar extinction ratio (ER) for either case. Quite evident from the data is that the 25G Miller eye diagram in the b2b configuration resembles the 50G NRZ data in the same condition. In both cases, a 13-tap T-spaced FFE equalizer was used. The more open eye result of transmitted 25G Miller data through 20 km of fiber can be attributed to, at least in part, a higher chromatic dispersion tolerance for the reduced transmission rate.

Thus, it appears that the inclusion of a 25G Miller encoding option in the 50G PON system may allow for extended reach transmissions well beyond the exemplary 20 km value. Of course, the extended reach benefit of the 25G Miller option comes at the cost of a lower line rate. It is contemplated that certain applications may be well-suited to prefer the extended reach over the higher transmission rate. The ability of the flexible PON system of the present invention to provide both alternatives is considered to be an advantageous, important feature.

Figure 7:
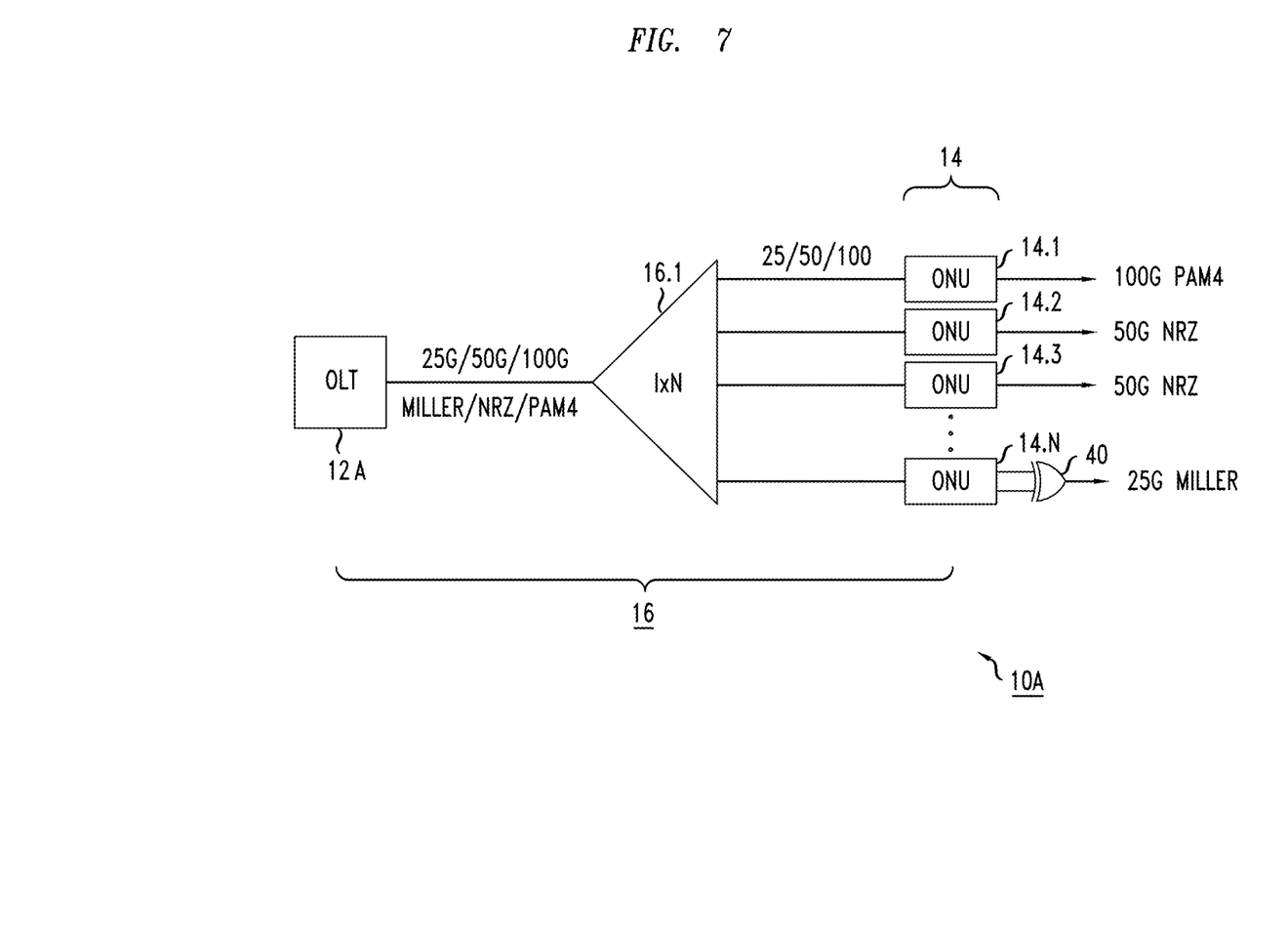
FIG. 7 is a diagram of another embodiment of the present invention, in this case a flexible PON system that supports 100G PAM4-modulated data in addition to 25G Miller data and 50G NRZ data.

While the above-described embodiments have focused on supplementing the 50G NRZ standard transmission rate (associated with ITU-T G.9804), it is to be understood that a flexible PON system of the present invention may also be enhanced to support the transmission of other modulation schemes that use similar CDR/equalizer components. Indeed, it is well-known that a 100 Gb/s ("100G") PAM4 modulated signal also uses a clock to perform data recovery and, therefore, an alternative embodiment of the inventive flexible PON system may be configured to support all three schemes: 25G Miller, 50G NRZ, and 100G PAM 4. FIG. 7 shows a flexible PON system 10A that utilizes these three rates, depicted as downstream transmission 25/50/100G. In this example, ONU 14.1 is shown as operating with the included 100G PON4 data, ONUs 14.2 and 14.3 operating with the 50G NRZ data, and ONU 14.N including an XOR gate 40 for recovering the 25G Miller-encoded data.

Figure 8:
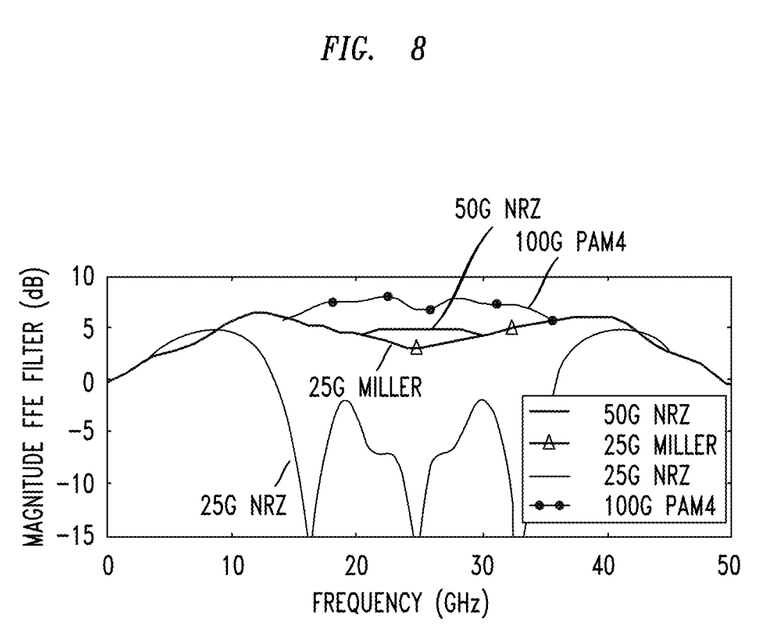
FIG. 8 contains plots of the magnitude of the frequency responses of the taps within the FFE equalizer portion of the ONU receiver, the plots for Miller, 50G NRZ, and 100G PAM4, as well as 25G NRZ for comparison purposes only.

FIG. 8 contains plots of the magnitude of the frequency response of the taps which are exemplary of an FFE equalizer portion used at the ONUs for equalization of the signal, as illustrated in FIG. 6. For comparison purposes, the frequency response of the tap weights for a 25G NRZ are also shown. It is observed that the filter response for 25G NRZ data is quite different from the set of three encodings (25G Miller, 50G NRZ, and 100G PAM4) used in flexible PON system 10A of the present invention. This difference in filter response can be attributed to the fact that for a conventional 25G NRZ signal, the 50 Gbaud T-spaced equalizer will generate two samples per symbol. However, for the Miller-encoded 25G signal, the FFE filter response is shown to closely match those of the 50G NRZ and 100G PAM4 modulations (since it is also based on a clocking rate). This data clearly supports the supposition that it is feasible, even when FFE equalization is performed at the receiver, to include Miller-encoded data with existing 50/100G PON systems, providing a 100G flexible PON system that provides the ability to use a lower line-rate in certain circumstances.

Summarizing, it is proposed to extend the capability of a 50G flexible PON by also providing a 25G modulation option (and, similarly, providing a 25/50/100G operation as well). The lower modulation rate allows for provided an extended reach to remote ONU locations, as well as higher loss capability. Another benefit provided by including a 25G option is as a "safe mode" option when certain fault scenarios occur at an ONU so that the standard 50G signals cannot be recovered. Inasmuch as the receiver front-end within a significant portion of the installed ONU equipment is already based upon 25G compatible elements, this reality of the equipment "limitation" can be exploited by the inventive technique of incorporating 25G Miller encoded data within the downstream signal.

While contemplated as a preferred embodiment, it is to be understood that the use of Miller encoding at any given baud rate R may be used in downstream PON communications with NRZ-encoded data utilizing a CDR at a 2R baud rate (and, similarly, supporting transmission of PAM4 signals using the same 2R baud rate for data recovery). As long as the CDR is configured to operate at a 2R baud rate, a pre-existing 2R flexible PON system (or even simply at a 2R PON system) may easily accommodate additional transmissions based on Miller encoding at the basic data rate of R.

As used in this application, the term "circuitry" may refer to one or ore or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s) that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Those skilled in the art to which this application pertains will appreciate that other and further additions, deletions, substitutions and modifications may be made to the described embodiments.

What is claimed is:

1. Apparatus comprising:
   transmission circuitry configured to create a downstream transmission in a point-to-multipoint (P2MP) passive optical network (PON) from at least two separate input signals, a first input signal comprising NRZ modulated data operating at a first data rate and a second input signal operating at a second data rate that is one-half of the first data rate; and
   encoding circuitry responsive to an incoming data stream operating at the second data rate and generating therefrom a delay-modulation encoded signal which is thereafter provided as the second input signal to the transmission circuitry, the delay-modulation encoded second input signal thereafter recoverable using a same clocking circuitry and a same clocking baud rate as the NRZ modulated first input signal.

2. Apparatus as defined in claim 1, wherein the encoding circuitry comprises logic circuitry configured to generate a delay-modulation encoded signal from the incoming data stream by applying the following rules:
   (1) each logic 1 in the incoming data stream is represented by a mid-bit transition in the delay-modulation encoded signal;
   (2) a logic 0 in the incoming data stream that is followed by a logic 1 and preceded by a logic 1 is ignored; and
   (3) a pair of adjacent logic 0's in the incoming data stream is represented by a transition at the mid-point of the pair of adjacent logic 0's in the delay-modulation encoded signal.

3. Apparatus as defined in claim 1, wherein the first input signal comprises an NRZ modulated signal operating at a first data rate of 50 Gb/s and the second input signal comprises a delay-modulation encoded signal operating at a second data rate of 25 Gb/s.

4. Apparatus as defined in claim 1, wherein the transmission circuitry is further responsive to a third input signal comprising PAM4 modulated data and operating at a third data rate that is twice the first data rate.

5. Apparatus as defined in claim 4, wherein the first input signal comprises an NRZ modulated signal operating at a first data rate of 50 Gb/s, the second input signal comprises a delay-modulation encoded signal operating at a second data rate of 25 Gb/s, and the third input signal comprises a PAM4 modulated signal operating at a third data rate of 100 Gb/s.

6. Apparatus as defined in claim 1 wherein the transmission circuitry and the encoding circuitry are located at an optical line terminal (OLT) and configured to broadcast the created downstream transmission to a plurality of receiving optical network units (ONUs), at least one ONU of the plurality of ONUs configured to receive NRZ modulated data and at least another ONU of the plurality of ONUs configured to receive delay modulated data, the plurality of ONUs including CDR circuitry operating at a baud rate equivalent to the first data rate.

7. Apparatus comprising:
   an optical-to-electrical (O/E) component configured to convert an incoming optical signal into an electrical representation thereof, the incoming optical signal having first data portions encoded using an NRZ modulation format and operating at a first data rate and second data portions encoded using a delay modulation format and operating at a second data rate that is one-half of the first data rate;
   clock and data recovery (CDR) circuitry coupled to the O/E component and configured to recover from the electrical representation of the incoming optical signal a clock operating at a fixed baud rate equal to the first data rate; and
   XOR logic circuitry responsive to both the recovered clock operating at the fixed baud rate and the electrical representation of the input optical signal and configured to recover therefrom second data portions operating at the second data rate.

8. Apparatus as defined in claim 7 wherein the O/E component, the CDR circuitry, and the XOR logic circuitry are located at an optical network unit (ONU) configured to receive a broadcasted the created downstream transmission from an optical line terminal (OLT).

9. A method of forming a downstream transmission in a passive optical network (PON), comprising
   accepting a first input data signal in an NRZ modulation format and operating at a first data rate;
   accepting a second input data signal operating at a second data rate that is one-half of the first data rate;
   applying a delay-modulation encoding to the second input data signal; and
   forming the downstream transmission including both the NRZ-modulated first input data signal and the delay-modulation encoded second input data signal, the delay-modulation encoded second input data signal thereafter recoverable using a same clocking circuitry and a same clocking baud rate as the NRZ modulated first input signal.

10. The method as defined in claim 9, the step of applying the delay-modulation encoding comprises:
   representing each logic 1 in the second input data signal by a mid-bit transition;
   ignoring a logic 0 that is followed by and preceded by a logic 1 in the second input signal; and
   representing a pair of adjacent logic 0's in the second input data signal by a transition at the mid-point of the pair of adjacent logic 0's.

11. The method as defined in claim 9, wherein the first data rate is 50 Gb/s and the second data rate is 25 Gb/s.

12. The method as defined in claim 9, further comprising accepting a third input data signal in a PAM4 modulation format operating at a third data rate that is twice the first data rate.

13. The method as defined in claim 12, wherein the first data rate is 50 Gb/s and the second data rate is 25 Gb/s, and the third data rate is 100 Gb/s.

\* \* \* \* \*